United States Patent
Uhlenhake et al.

(10) Patent No.: US 9,957,822 B2
(45) Date of Patent: May 1, 2018

(54) ASYMMETRIC TWIN SCROLL VOLUTE

(71) Applicant: BorgWarner Inc., Auburn Hills, MI (US)

(72) Inventors: Gregory David Uhlenhake, Arden, NC (US); Matthew Brian Cooley, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 70 days.

(21) Appl. No.: 15/037,701

(22) PCT Filed: Nov. 19, 2014

(86) PCT No.: PCT/US2014/066471
§ 371 (c)(1),
(2) Date: May 19, 2016

(87) PCT Pub. No.: WO2015/077379
PCT Pub. Date: May 28, 2015

(65) Prior Publication Data
US 2016/0298471 A1     Oct. 13, 2016

Related U.S. Application Data

(60) Provisional application No. 61/908,338, filed on Nov. 25, 2013.

(51) Int. Cl.
*F01D 9/02*     (2006.01)
*F02B 37/00*     (2006.01)
(Continued)

(52) U.S. Cl.
CPC .............. *F01D 9/026* (2013.01); *F01D 25/24* (2013.01); *F02B 33/40* (2013.01); *F02B 37/00* (2013.01);
(Continued)

(58) Field of Classification Search
CPC ...... A61K 41/0042; A61K 9/06; A61K 47/34; A61K 47/10; C08G 65/33327;
(Continued)

(56) References Cited

U.S. PATENT DOCUMENTS 7,302,800 B2 * 12/2007 Klingel ................. F02B 37/013
  417/406
8,951,007 B2 * 2/2015 Botsch .................. F01D 25/246
  415/158
(Continued)

OTHER PUBLICATIONS

Written Opinion and International Search Report dated Mar. 11, 2015, in International Application No. PCT/US2014/066471.

*Primary Examiner* — Hoang Nguyen
(74) *Attorney, Agent, or Firm* — Eric L. Doyle; Stephan A. Pendorf; Patent Central LLC

(57) ABSTRACT

An asymmetric twin scroll turbine 10 combined with an integrated exhaust manifold cylinder head 20 may be designed to accommodate mixed, radial or axial flow turbines. The asymmetric twin scroll turbine 10 includes a first scroll 11 and second scroll 12 wherein the first scroll 11 is larger and has greater mass flow capacity than the second scroll 12. The larger volute increases flow capacity and counteracts backpressure creating evenly balanced or equalized peak pressures and pulsations between both volutes and balancing of gas flow between cylinder sets. By equalizing peak pressures, pulsations, and gas flow between cylinder sets, engine self-ignition can be avoided in the cylinder set that would have had the largest peak pressures and pulsations. By in creasing flow capacity of the larger volute and balancing gas flow between cylinder sets, the turbine pressure differential is reduced and the engine can operate more efficiently, improving fuel economy.

8 Claims, 3 Drawing Sheets

(51) Int. Cl.
  *F01D 25/24* (2006.01)
  *F02B 37/02* (2006.01)
  *F02B 33/40* (2006.01)
  *F01N 13/10* (2010.01)

(52) U.S. Cl.
  CPC .......... *F02B 37/025* (2013.01); *F01N 13/107* (2013.01); *F05D 2220/40* (2013.01); *Y02T 10/144* (2013.01)

(58) Field of Classification Search
  CPC ............ C08G 65/3344; C08G 2650/04; C08G 2210/00; F01D 9/026; F01D 25/24; F02B 37/00; F02B 33/40; F02B 37/025; F05D 2220/40; Y02T 10/144; F01N 13/107
  USPC ............ 60/605.1; 415/205; 29/889.2, 889.21
  See application file for complete search history.

(56) References Cited

U.S. PATENT DOCUMENTS

| | | |
|---|---|---|
| 2005/0011193 A1 | 1/2005 | Pagot |
| 2005/0086936 A1 | 4/2005 | Bucknell et al. |
| 2010/0229551 A1* | 9/2010 | Wu .................. F01D 9/026 60/605.1 |
| 2011/0302917 A1 | 12/2011 | Styles et al. |
| 2013/0195639 A1 | 8/2013 | Serres et al. |
| 2013/0276754 A1 | 10/2013 | Breuer et al. |
| 2015/0315961 A1* | 11/2015 | Uhlenhake .............. F02B 37/12 60/602 |
| 2016/0053676 A1* | 2/2016 | Ge .................. F02B 37/025 60/602 |

\* cited by examiner

ASYMMETRIC TWIN SCROLL VOLUTE

CROSS-REFERENCE TO RELATED APPLICATION

This application claims priority to and all the benefits of U.S. Provisional Application No. 61/908,338, filed on Nov. 25, 2013, and entitled "Asymmetric Twin Scroll Volute" which is incorporated herein by reference.

BACKGROUND OF THE DISCLOSURE

Field of the Disclosure

This disclosure relates to a turbine volute for the turbocharger of an internal combustion engine. More particularly, this disclosure relates to a turbocharger housing having an asymmetrical twin scroll turbine volute combined with an integrated exhaust manifold cylinder head that may be designed to accommodate mixed, radial or axial flow turbines.

Description of Related Art

A turbocharger is a type of forced induction system used with internal combustion engines. Turbochargers deliver compressed air to an engine intake, allowing more fuel to be combusted, thus boosting the horsepower of the engine without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the exhaust manifold of the engine, a compressor housing connected to the intake manifold of the engine, and a center bearing housing disposed between and coupling the turbine and compressor housings together. The turbine housing defines a generally annular chamber, scroll or volute that surrounds the turbine wheel and that receives exhaust gas from the engine. The turbine assembly generally includes a nozzle that leads from the chamber into the turbine wheel. The turbine wheel in the turbine housing is rotatably driven by an inflow of exhaust gas supplied from the exhaust manifold. A shaft rotatably supported in the center bearing housing, connects the turbine wheel to a compressor impeller in the compressor housing so that rotation of the turbine wheel causes rotation of the compressor impeller. The shaft connecting the turbine wheel and the compressor impeller defines a line which is the axis of rotation. Exhaust gas flows from the chamber, scroll or volute through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake. As the compressor impeller rotates, it increases the air density and air pressure delivered to the cylinders of the engine via the engine intake manifold.

The stream of exhaust gas discharged by a cylinder via the engine exhaust manifold involves a series of short bursts or pulses of exhaust gas. In engines with multiple cylinders, it is typical to group the cylinders in two cylinder groups or cylinder banks. The cylinders grouped in one cylinder bank exhaust into one exhaust gas discharge line and the cylinders grouped in the other cylinder bank exhaust into another separate exhaust gas discharge line. The two discharge lines then feed exhaust gas to the turbocharger such that the streams of exhaust gas provided by the two discharge lines are kept separate for as long as possible.

The amount of work that can be done across an exhaust turbine is determined by the pressure differential at the turbine inlet and turbine outlet. The greater the pre-turbine pressure (at the turbine inlet) compared to the post-turbine pressure (at the turbine outlet), the greater the amount of work that can be transmitted through the turbine/compressor shaft. At the turbine outlet is the exhaust. An engine exhaust is a system put in place to reduce emissions and noise through the use of as assortment of catalysts, filters, and mufflers. This assortment of components creates a restriction on the flow, causing an increased pressure at the turbine outlet relative to atmosphere. The turbine then creates an additional pressure differential, elevating turbine inlet pressure above that of the turbine outlet. The turbine uses this pressure differential to create turbine power. Although the turbine may recover this pressure differential and the additional wasted energy of the hot exhaust gas, the increased backpressure caused by the turbine can increase the pumping work of an engine, which will reduce fuel economy. It is desirable to minimize the pressure differential at the turbine inlet and outlet without hurting performance, and thereby reduce backpressure and reduce the pumping work of the engine. Additionally, if the pressure differential becomes large, the cylinder head exhaust port pressure can overcome the exhaust valve spring, causing unwanted hot exhaust gas to enter the cylinder via the exhaust valve prior to ignition, causing engine self-ignition and in some cases leading to premature failure.

SUMMARY OF THE DISCLOSURE

This disclosure is related to reducing turbocharger backpressure, balancing the pressure differentials at the turbocharger outlet and the exhaust inlet, and increasing the flow capacity of the turbine. More specifically, the disclosure is related to an asymmetric twin scroll turbine volute combined with an integrated exhaust manifold cylinder head that may be designed to accommodate mixed, radial or axial flow turbines. The disclosure comprises a turbine assembly including a turbine housing having an exhaust gas inlet for receiving exhaust gas from an engine and an integrated exhaust manifold cylinder head including exhaust gas ports for conducting a flow of exhaust gas out of the engine cylinders. The exhaust ports of the integrated exhaust manifold feed directly into the turbine housing (not shown), as such, no separate exhaust manifold is needed. The turbine housing includes an asymmetric twin scroll volute configured to direct exhaust gas into the turbine wheel.

The asymmetric twin scroll design of the disclosure includes a first scroll and a second scroll where the first scroll is larger in volume and flow parameter than the second scroll. The larger volute increases flow capacity and counteracts backpressure creating evenly balanced or equalized peak pressures and pulsations between both volutes and balancing of gas flow between cylinder sets. By equalizing peak pressures, pulsations, and gas flow between cylinder sets, engine self-ignition can be avoided in the cylinder set that would have had the largest peak pressures and pulsations. By increasing flow capacity of the larger volute and balancing gas flow between cylinder sets, the turbine pressure differential is reduced and the engine can operate more efficiently, improving fuel economy. While the use of an integrated exhaust manifold may create some volume discrepancies for which this disclosure can be used, this disclosure can also be perceived without the use of an integrated exhaust manifold. This may apply in instances where the volume of exhaust passages from valve to turbine wheel inlet varies from cylinder to cylinder.

In some aspects, an engine system includes an asymmetric turbine combined with an integrated exhaust manifold, the system including a turbine having a turbine housing having a turbine inlet and a turbine outlet and an integrated exhaust manifold including an exhaust flange coupled to the turbine outlet. The turbine housing includes at least one (first) volute and at least another (second) volute having a wall disposed therebetween. The at least one (first) volute and the at least another (second) volute each have a size and a mass flow capacity. The at least one (first) volute is larger in size and mass flow capacity than the at least another (second) volute.

The system may include one or more of the following features: The integrated exhaust manifold further comprises at least one (first) pair of ports connected to the at least one (first) volute and the turbine inlet and at least another (second) pair of ports connected to the at least another (second) volute and the turbine inlet. The one (first) pair of ports and the at least another (second) pair of ports each comprises a port volume; wherein the port volume of the at least one (first) pair of ports is less than the port volume of the at least another (second) pair of ports. The mass flow capacity in the at least one (first) volute is set to accommodate the volume asymmetry of an engine connected to the integrated exhaust manifold in such a way as to keep peak pressures of cylinder exhaust ports of the engine below a predetermined level. The desired pressure is less than a spring force of a closing spring of a cylinder exhaust port valve of the engine. An exhaust flow through the turbine alternates between the at least one (first) volute and the at least another (second) volute. An amount of asymmetry of the at least one (first) volute relative to the at least another (second) volute is determined based on a) a flow capacity required by the engine size to keep peak pressures of cylinder exhaust ports of the engine below a predetermined level, and b) a scaling factor selected based upon the output of a one dimensional or one dimensional/three dimensional engine simulation tool that incorporates the flow capacity and factors engine dimensions and pulsations into simulation calculations.

In some aspects, a process for optimizing the amount of asymmetry of volutes of an asymmetric twin scroll turbine is provided, where the amount of asymmetry is defined by a scaling factor. The process includes determining a flow capacity required by the engine size to keep peak pressures of cylinder exhaust ports of the engine below a predetermined level; and incorporating the determined flow capacity in an engine simulation tool that factors engine dimensions and pulsations into simulation calculations, and using the tool to determine the scaling factor. In the process, the engine simulation tool is a one dimensional or a one dimensional/three dimensional engine simulation tool, and output of the engine simulation tool is used to calculate the scaling factor for the volutes.

DETAILED DESCRIPTION OF THE DISCLOSURE

Figure 1:
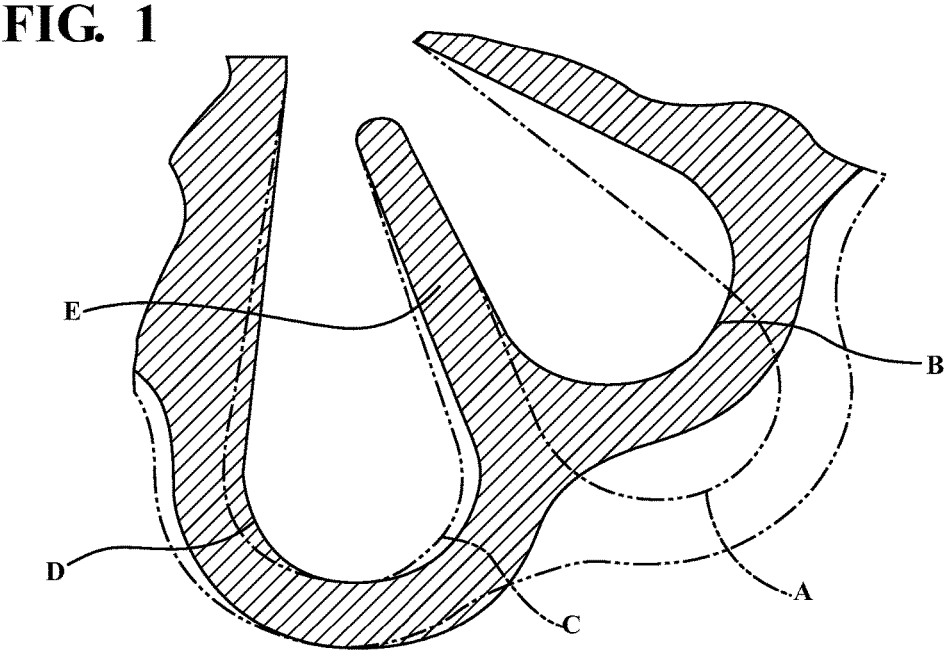
FIG. 1 is a cross-sectional view of a conventional twin scroll volute design super imposed upon the asymmetric volute design of the present disclosure.

FIG. 1 details a conventional twin scroll volute design (shown with hatched lines) having volutes (B, D) super imposed upon the asymmetric volute design of the present disclosure (shown as shaded) and having volutes (A, C). The conventional "twin-scroll" volute has equal flow capacity in each scroll (B, D). As detailed, the asymmetric volute design of the present disclosure (shown as shaded) includes at least one "scroll" or volute (A) that is larger in volume and flow parameter than volute (B) of the conventional "twin-scroll" volute design (shown with hatched lines). Manufacture of the dividing wall (E) between volutes (A, C) of the present disclosure affected a slight repositioning of the conventional "twin-scroll" volute (D) to which is now the new volute (C) of the present asymmetric volute design wherein clearly volute (A) is larger than volute (C).

Figure 3:
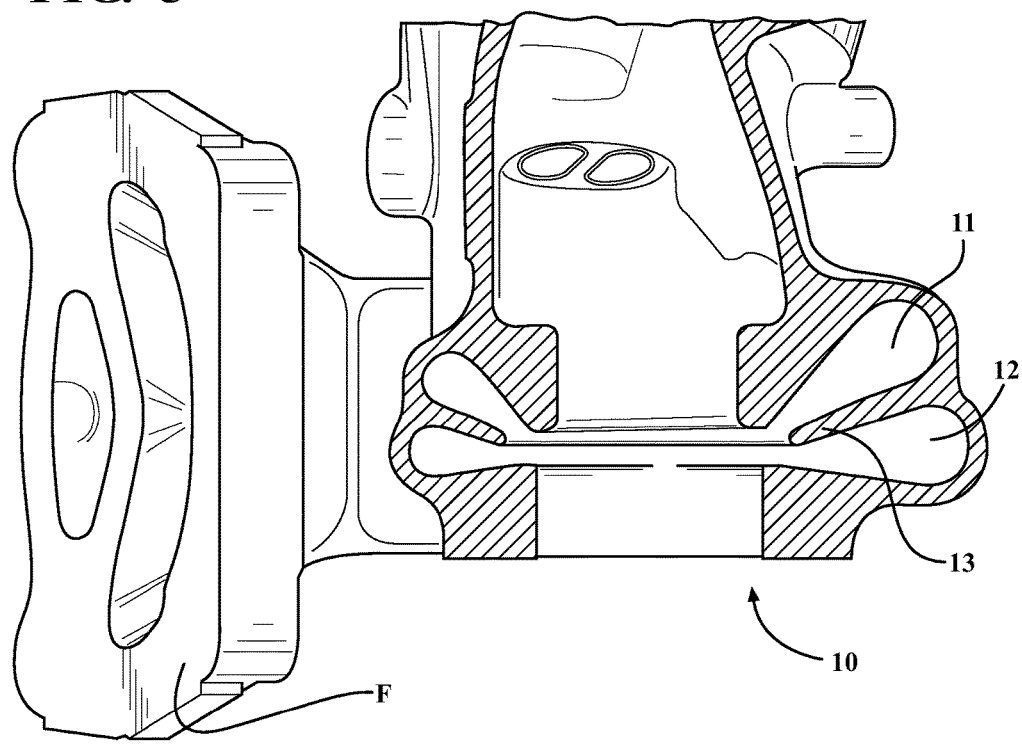
FIG. 3 is a cross-sectional view of the disclosed asymmetric volute design.
Figure 2:
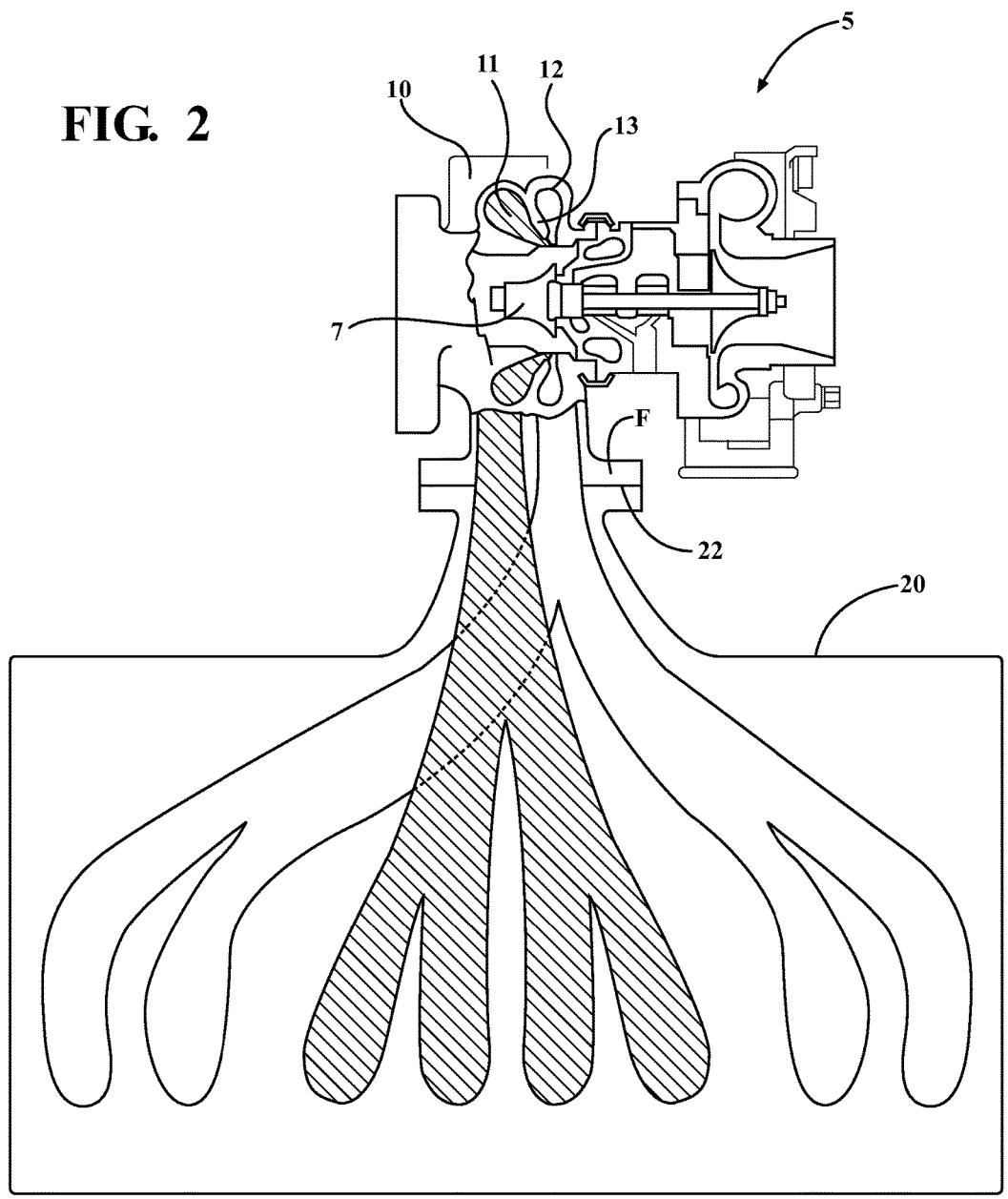
FIG. 2 is a schematic diagram illustrating an engine system including an asymmetric turbine combined with an integrated exhaust manifold.
Figure 4:
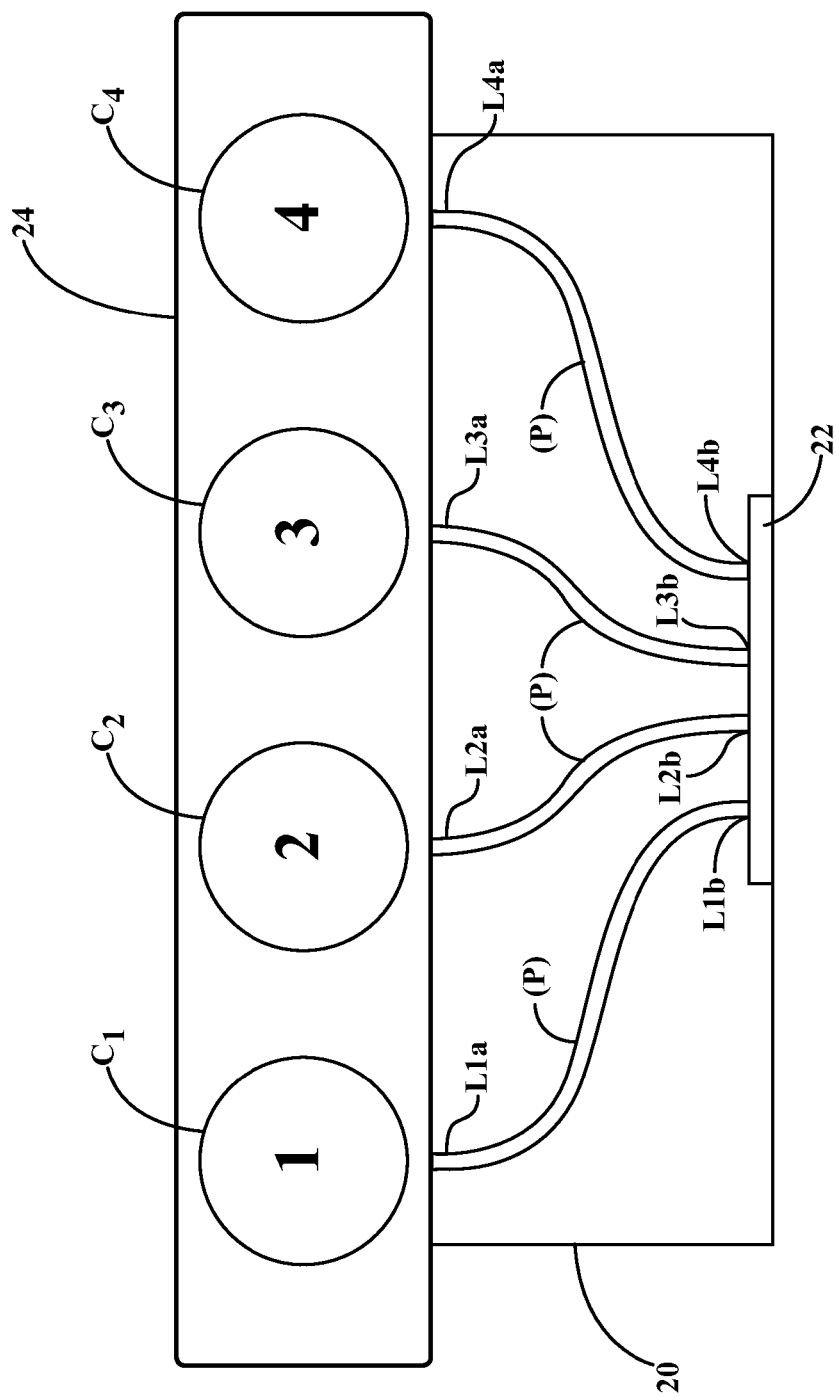
FIG. 4 is a schematic view of an exemplary engine including the integrated exhaust manifold of the present disclosure.

Referring to FIGS. 2-4, an engine system 1 includes an exhaust gas turbocharger 5 combined with an integrated exhaust manifold cylinder head 20 of an engine 24. The turbocharger 5 includes a turbine 10 having an asymmetric twin scroll design. The twin scroll design includes a first volute 11 and a second volute 12 divided by a wall 13 which extends to the cylinder head outlet face 22. In order to control flow, a wastegate and actuating mechanism can also be provided but is not shown. The first volute (or one volute) 11 is larger than the second volute (or the other volute) 12.

The integrated exhaust manifold cylinder head 20 includes an exhaust gas port for each cylinder of the engine 24. In the illustrated embodiment, the engine 24 includes four cylinders (C1-C4), and thus there are four exhaust gas ports P1-P4. The exhaust gas ports P1-P4 are passageways between the cylinder exhaust valves (not shown) and the cylinder head outlet face 22, and feed directly into the turbine housing 10 through the turbine inlet flange F. As further detailed below, the exhaust gas port lengths (L1a to L1b), (L2a to L2b), (L3a to L3b) and, (L4a to L4b) from the cylinder exhaust valves (not shown) of the cylinders C1-C4; respectively, to the turbine inlet flange F differ depending on which cylinder (i.e. cylinders 1-4) is being considered. In the illustrated embodiment, the exhaust gas port lengths (L2a to L2b), (L3a to L3b) of cylinders two C2 and three C3 are shorter than the exhaust gas port lengths (L1a to L1b), (L4a to L4b) of cylinders one C1 and four C4. Since the exhaust gas ports P1-P4 have a generally uniform cross sectional area along their length, and since the second and third exhaust gas ports P2, P3 corresponding to cylinders two C2 and three C3 have a shorter length, the second and third exhaust gas ports P2, P3 carry less volume through the exhaust manifold 20 than the first and fourth exhaust gas ports P1, P4.

In a conventional symmetric volute turbine arrangement, the volume discrepancies of this port arrangement can result in increased exhaust backpressure at the cylinder exhaust valve (not shown) in cylinders (2) and (3) which have smaller volume exhaust ports (not shown). To address the variations in exhaust backpressures across the cylinders C1-C4, the system 1 is arranged so that the length of flow from the cylinders C1-C4 within the exhaust manifold 20 to the flange/turbine inlet flange (F) within the exhaust gas ports P1-P4, combined with the distribution of flow within the designated volute 11, 12, is configured to reduce the peak backpressure and increase mass flow capacity of the lower volume cylinder set and volute, resulting in reduced pumping work and increased fuel economy with minimal impact on transient response.

Referring to FIGS. 2 and 4, an exemplary cylinder to volute feed arrangement is based upon the four cylinder engine design. In particular, the second and third exhaust gas ports P2, P3 corresponding to cylinders two C2 and three C3, which have a shorter length, and thus carry less volume through the exhaust manifold 20 are therefore connected to the larger or first volute 11 shown in FIG. 2; while the first and fourth exhaust gas ports P1, P4 corresponding to cylinders one C1 and four C4, having a larger distance to travel and carrying a larger volume through the exhaust manifold 20, are connected to the other or second volute 12.

The aforementioned cylinder-to-volute feed arrangement is not absolute and may be affected by firing order which can be strategically designed for purpose and efficiency.

In the illustrated embodiment, the first volute 11 having a relatively larger size is connected to cylinder exhaust gas ports P2, P3 having a relatively smaller volume, and the second volute having a relatively smaller size is connected to the cylinder exhaust gas ports P1, P4 having a relatively larger volume. As used herein, the volute size refers to the ratio A/R. The size difference between volutes 11, 12 allows the mass flow capacity through the turbine to be increased for the exhaust gas ports having less volume between the cylinder exhaust valves (not shown) and the cylinder head outlet face 22, thereby reducing backpressure at the cylinders C2-C3.

The turbine asymmetric twin scroll volutes 11, 12 can be sized and/or adjusted according to the flow capacity required/demanded by the engine size. A scaling factor for determining volute sizes and changes in volute sizes can be selected based upon the results of an engine simulation which factors in engine dimensions and pulsations. For example, a 1-D (one dimensional) or 1-D/3-D (one dimensional/three dimensional) engine simulation tool can be used to optimize the level of asymmetry (scaling factor) for a given engine configuration and/or flow capacity. The engine simulation tool does not directly provide the scaling factor. Rather, the simulation results are used to calculate a scaling factor for the volutes in a somewhat iterative process. Firing order pulsations alternate between volutes. When there is no asymmetric volute design, excess pressure in the lower volume exhaust ports (P2-P3 in the exemplary case) can create a pressure-induced opening force on the exhaust valve (not shown) which can overcome the valve spring force associated with opening/closing of the exhaust valve (not shown), thereby allowing the exhaust valve (not shown) to open unintentionally or prematurely at points of time during the combustion cycle when the exhaust valve (not shown) should be closed. When the exhaust gas valve (not shown) opens unintentionally, or prematurely, during the combustion cycle, hot exhaust gases are allowed to flow back into the cylinder and leads to the engine self-igniting and ultimately failing. Increasing valve spring rate is one way of preventing engine failure; however, the drawback is that valve train efficiency is reduced. The engine system 1 disclosed herein combining an asymmetric twin scroll turbine with the integrated exhaust manifold cylinder head permits the peak exhaust pressure values to be made the same across all four cylinders C1-C4, preventing the self-ignition problem described above without increasing valve spring stiffness (or by minimizing the increase in stiffness). This will ensure that valve train efficiency and engine efficiency are optimized, maximizing fuel economy.

During operation, the exhaust from the cylinders C1-C4 passes through the turbine 10, causing the turbine wheel 7 to spin. The more exhaust that goes through the blades of the turbine wheel 7, the faster the turbine wheel 7 spins. Exhaust gas is fed from cylinders two C2 and three C3, having a shorter length and delivering less volume through the exhaust manifold 20 to feed the larger or first volute 11; while cylinders one C1 and four C4, having a greater length and delivering a larger volume through the exhaust manifold 20, feed the other or second volute 12. Firing order pulsations alternate between the first and second volutes 11, 12 and are strategically preselected depending upon the required purpose and the associated efficiency desired. The larger mass flow capacity through the larger volute 11 reduces the excess pressure that may generally build up in conventional twin scroll volutes of equal proportion; diminishes the forces that can be imposed upon the exhaust valve spring; prevents the exhaust valve (not shown) from opening unintentionally or prematurely at points of time during the combustion cycle; and inhibits hot exhaust gases from flowing back into the cylinder, self-igniting and ultimately causing engine failure.

In the combined turbine and integrated exhaust manifold cylinder head system 1, the mass flow capacity in the larger volute 11 is set to accommodate the volume asymmetry of the engine 24 connected to the integrated exhaust manifold 20 in such a way as to keep peak pressures of cylinder exhaust ports P1-P4 of the engine 24 below a predetermined level. In particular, the predetermined level is less than the spring force of a closing spring of a cylinder exhaust port valve of the engine 24. Here it is noted that the valves and valve closing springs are the same for all cylinder exhaust ports of the engine 24.

Although the engine system 1 is described herein with respect to use in a four cylinder engine 24, the system 1 including an asymmetric turbine 10 combined with an integrated exhaust manifold 20 is not limited to use in a four cylinder engine, and can be implemented in an engine having a greater or fewer number of cylinders.

Although the turbine 10 includes an asymmetric twin scroll volute design in which the volutes A and 11, illustrated herein as being closer to the turbine outlet than volutes C and 12, have been described above as being relatively larger than the volute C and 12, the turbine is not limited to this configuration. For example, the turbine 10 can alternatively include an asymmetric twin scroll volute design in which the volutes A and 11 are relatively smaller than the volutes C and 12.

Aspects of the disclosure have been described herein in an illustrative manner, and it is to be understood that the terminology used is intended to be in the nature of words of description rather than limitation. Many modifications and variations of the present disclosure are possible in light of the above teachings. It is, therefore, to be understood that within the scope of the appended claims, the disclosure may be practiced other than as specifically enumerated within the description.

What is claimed:

1. An engine system (1) comprising an asymmetric turbine (10) combined with an integrated cylinder head and exhaust manifold (20) including a turbine including a turbine housing (10) having a turbine inlet having an inlet flange (F) and a turbine outlet;

an integrated cylinder head and exhaust manifold (20) including an exhaust flange coupled to the inlet flange (F) of the turbine housing (10) inlet;

wherein the turbine housing (10) includes at least one first volute (11) and at least one second volute (12) having a wall (13) disposed between the first and second volutes (11, 12);

the at least one first volute and at least one second volute (11, 12) each having a size and a mass flow capacity;

wherein the at least one first volute (11) is larger in size and mass flow capacity than the at least one second volute (12), wherein the integrated cylinder head and exhaust manifold (20) further comprises:

at least one first pair of ports (P2, P3) connected to the at least one first volute (11) and the turbine housing (10) inlet and at least one second pair of ports (P1, P4) connected to the at least one second volute (12) and the turbine housing (10) inlet, and wherein the at least one first pair of ports (P2, P3) and the at least one second pair of ports (P1, P4) each comprises a port volume; wherein the port volume of the at least one first pair of ports (P2, P3) is less than the port volume of the at least one second pair of ports (P1, P4).

2. An engine system (1) comprising an asymmetric turbine (10) combined with an integrated cylinder head and exhaust manifold (20 including a turbine including a turbine housing (10) having a turbine inlet having an inlet flange (F) and a turbine outlet;

an integrated cylinder head and exhaust manifold (20) including an exhaust flange coupled to the inlet flange (F) of the turbine housing (10) inlet;

wherein the turbine housing (10) includes at least one first volute (11) and at least one second volute (12) having a wall (13) disposed between the first and second volutes (11, 12);

the at least one first volute and at least one second volute (11, 12) each having a size and a mass flow capacity;

wherein the at least one first volute (11) is larger in size and mass flow capacity than the at least one second volute (12), and wherein the mass flow capacity in the at least one first volute (11) is set to accommodate a volume asymmetry of an engine (24) connected to the integrated cylinder head and exhaust manifold (20) in such a way as to keep peak pressures of cylinder exhaust ports (P1, P2, P3, P4) of the engine (24) below a predetermined level.

3. The system (1) according to claim 2, wherein the desired peak pressure predetermined level is less than a spring force of a closing spring of a cylinder exhaust port valve of the engine (24).

4. The system (1) according to claim 2, wherein an exhaust flow through the turbine housing (10) alternates between the at least one first volute (11) and the at least one second volute (12).

5. An engine system (1) comprising an asymmetric turbine (10) combined with an integrated cylinder head and exhaust manifold (20 including a turbine including a turbine housing (10) having a turbine inlet having an inlet flange (F) and a turbine outlet;

an integrated cylinder head and exhaust manifold (20) including an exhaust flange coupled to the inlet flange (F) of the turbine housing (10) inlet;

wherein the turbine housing (10) includes at least one first volute (11) and at least one second volute (12) having a wall (13) disposed between the first and second volutes (11, 12);

the at least one first volute and at least one second volute (11, 12) each having a size and a mass flow capacity;

wherein the at least one first volute (11) is larger in size and mass flow capacity than the at least one second volute (12), and wherein an amount of asymmetry of the at least one first volute (11) relative to the at least one second volute (12) is determined based on a) a flow capacity required by the engine size to keep peak pressures of cylinder exhaust ports (P1, P2, P3, P4) of the engine (24) below a predetermined level, and b) a scaling factor selected based upon the output of a one dimensional or one dimensional/three dimensional engine simulation tool that incorporates the flow capacity and factors engine dimensions and pulsations into simulation calculations.

6. A process for optimizing the amount of asymmetry of volutes of an asymmetric twin scroll turbine, where the amount of asymmetry is defined by a scaling factor, the process comprising determining a flow capacity required by the engine size to keep peak pressures of cylinder exhaust ports (P1, P2, P3, P4) of the engine (24) below a predetermined level;

incorporating the determined flow capacity in an engine simulation tool that factors engine dimensions and pulsations into simulation calculations, and using the tool to determine the scaling factor.

7. The process of claim 6 wherein the engine simulation tool is a one dimensional or a one dimensional/three dimensional engine simulation tool.

8. The process of claim 6 wherein output of the engine simulation tool is used to calculate the scaling factor for the volutes.

* * * * *